(12) United States Patent
Adams et al.

(10) Patent No.: US 11,657,719 B2
(45) Date of Patent: May 23, 2023

(54) SYSTEM FOR SPARSELY REPRESENTING AND STORING GEOGRAPHIC AND MAP DATA

(71) Applicant: Zoox, Inc., Foster City, CA (US)

(72) Inventors: Derek Adams, Santa Clara, CA (US); Michael Carsten Bosse, Cupertino, CA (US); Elena Stephanie Stumm, San Francisco, CA (US); Veeresh Taranalli, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 216 days.

(21) Appl. No.: 17/247,646

(22) Filed: Dec. 18, 2020

(65) Prior Publication Data

US 2022/0198935 A1    Jun. 23, 2022

(51) Int. Cl.
G08G 1/00        (2006.01)
G06N 20/00       (2019.01)
G01C 21/00       (2006.01)
B60W 60/00       (2020.01)

(52) U.S. Cl.
CPC ............. *G08G 1/22* (2013.01); *B60W 60/001* (2020.02); *G01C 21/3807* (2020.08); *G01C 21/3841* (2020.08); *G06N 20/00* (2019.01); *G08G 1/20* (2013.01); *B60W 2420/42* (2013.01); *B60W 2420/52* (2013.01); *B60W 2556/50* (2020.02); *B60W 2556/65* (2020.02)

(58) Field of Classification Search
CPC .... G08G 1/22; G05D 1/0212; G06F 16/9537; B60W 10/20; B60W 40/076; G01S 13/62; G01C 21/3697; G01C 21/3492; G01C 21/3841
See application file for complete search history.

(56) References Cited

U.S. PATENT DOCUMENTS

| | | | |
|---|---|---|---|
| 2015/0268054 A1* | 9/2015 | Stankoulov | G01C 21/3697 701/123 |
| 2019/0017825 A1* | 1/2019 | Dong | G06F 16/9537 |
| 2019/0096086 A1 | 3/2019 | Xu et al. | |
| 2019/0361443 A1* | 11/2019 | Linscott | G05D 1/0212 |

FOREIGN PATENT DOCUMENTS

| | | | | |
|---|---|---|---|---|
| CA | 2789699 A1 | * | 9/2011 | G01C 21/3492 |
| EP | 3739356 A1 | * | 11/2020 | G01P 15/18 |
| FR | 2905334 A1 | * | 3/2008 | B60W 10/20 |

OTHER PUBLICATIONS

The International Search Report and Written Opinion for PCT App. No. PCT/US21/62352, dated Mar. 24, 2022.

* cited by examiner

*Primary Examiner* — Yuri Kan

(74) *Attorney, Agent, or Firm* — Lee & Hayes, P.C.

(57) ABSTRACT

Techniques associated with generating and maintaining sparse geographic and map data. In some cases, the system may maintain a factor graph comprising a plurality of nodes. In some cases, the nodes may comprise pose data and sensor data associated with an autonomous vehicle at the geographic position represented by the node. The nodes may be linked based on shared trajectories and shared sensor data.

20 Claims, 13 Drawing Sheets

SYSTEM FOR SPARSELY REPRESENTING AND STORING GEOGRAPHIC AND MAP DATA

BACKGROUND

Autonomous vehicles may rely on large amounts of environmental and map data to assist with navigation. However, because of the graphical nature and amount of environmental and map data used by the autonomous vehicle transmitting, storing, and processing the environmental and map data is resource and time intensive.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
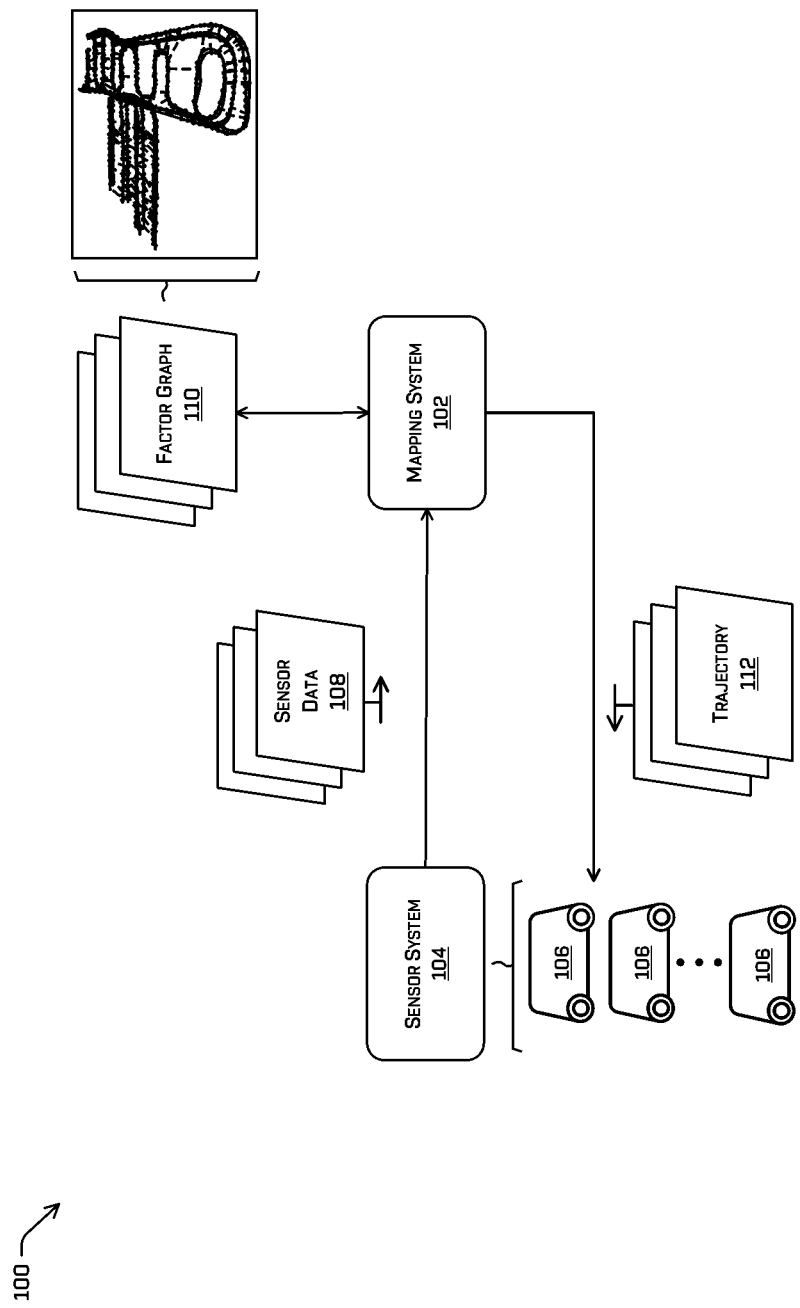
FIG. 1 is a block-diagram illustrating an example architecture of a mapping system associated with a plurality of autonomous vehicles, in accordance with implementations of the disclosure.

Techniques for sparsely storing, processing, and otherwise utilizing environmental data and map data are discussed herein. For example, when an autonomous vehicle receives a request to travel to a destination location, the autonomous vehicle may navigate along a planned path from the current location of the autonomous vehicle to a pickup location to pick up a passenger and then from the pickup location to the destination location. The autonomous vehicles may estimate a pose (e.g., position and/or orientation) of the vehicle and associate with the pose environmental data captured by sensors associated with the vehicle. Both the map data and the environmental data may be used by the autonomous vehicle to assist with navigating to the destination.

For example, the environmental data captured by sensor(s) may be used to generate a representation of the environment, such as a two- or three-dimensional representation of the surfaces in an environment, such as a contour map, a polygon mesh, a wire-frame model, or the like. Generating such a representation may be based at least in part on a position and orientation of the vehicle and its sensors at the time the environment data was captured. Generating and/or updating this representation may be complicated by environmental data generated for a same portion of the environment by repeated passes of an autonomous vehicle, potentially from different positions and angles, which may indicate different perspectives of a same object or environment.

In various instances, the autonomous vehicle may encounter a situation which requires a portion of the map data and/or environmental data to be updated. In conventional systems, updating portions of the data associated with a geographic region often requires parsing the entire dataset associated with that geographic region and/or performing various operations in sequence (which is both time and resource inefficient). In some time-sensitive operations, such as autonomous vehicle navigation, any delay resulting from updating or retrieving the map data and/or environmental data may be problematic.

In some examples, the system, discussed herein, may be configured to store the map data and/or environmental data as a sparse data graph or factor graph. In some cases, the sparse data graph may also be indexed, such as along geographic regions, to reduce resource consumption and time associated with accessing and/or updating the map data and/or environmental data. In some cases, the system, discussed herein, may comprise a database or datastore that maintains an organized and indexed sparse graph of map data and/or environmental data at specific time intervals that allows various other system of the autonomous vehicle to operate in parallel on the graph data.

In one specific example, the organized and indexed sparse graph or factor graph may comprise a plurality of nodes associated with or representative of an environment. In some cases, the nodes may comprise or store pose data as well as a number of factors created from information, such as, direction of travel, orientation or IMU data, velocity, image data, radar data, lidar data, thermal data, unary global factors, such as received form a global position system (GPS), map localization data, and the like, that may be used to organize the nodes into the factor graph representation of the pose data. In some cases, the plurality of nodes may be sparsely represented as moments (e.g., a six degree of freedom (6DOF) pose at a particular time) along a trajectory or a single node may be formed from a plurality of moments in which the 6DOF pose of each moment is maintained in relative to a representative node or moment. As an illustrative example, the system may store relative transforms (e.g., 6DOF transforms) between the pose of each moment within a node and the representative node or moment. In this manner, each moment may be recreated by performing the relative transforms in reverse.

In one example, an autonomous vehicle may traverse along a route by determining trajectories based at least in part on sensor data. A trajectory may include a set of instructions for actuating the drive system up until a horizon time or distance (e.g., the next 50 milliseconds, the next 100 milliseconds, the next second, any other amount of time, the next 3 meters, the next 10 meters, the next 50 feet, any other distance). As the vehicle traverses a trajectory, the vehicle may determine a first pose (e.g., position and/or orientation) at a first time based at least in part on first sensor data and a second pose at a second time based at least in part on second sensor data. The first pose at the first time and the second pose at the second time may be represented by nodes within the factor graph that are linked based on the shared trajectory.

In addition to linking nodes within the factor graph based on a shared trajectory, in some cases, the system may link nodes using sensor data (such as lidar data, camera data, and the like). For example, two poses (e.g., a first pose and a third pose) along different trajectories may be linked using the sensor data to indicate a position of the first pose within the factor graph and/or the environment with respect to the third pose. For instance, the system may, based on an analysis of the sensor data, identify landmarks or static environmental objects that are captured at both the first pose and the third pose. The system may then add a graph link or connection between the first pose and the third pose. In some case, the system may determine relative position data (such as a distance between the position of the first pose and the third pose) and the relative pose data may be represented by a transform of the link between the first pose and the third pose.

As other examples, system may also link nodes based at least in part on preforming operations associated with each node. For example, the system may determine shared unary global factors derived from GPS data, map localization data, or other geographic based position data. As another example, the system may link nodes based on preforming association and/or loop closure operations between the sensor data (e.g., image data, lidar data, radar data, and the like) between two nodes. In one particular example, the system may determine links by matching the sensor data of a particular nodes based at last in part on existing or preexisting map data or road networks. In some cases, the system may also generate links based at least in part on a determined proximity within a Euclidean distance or framework between the relative 6DOF pose of two or more nodes. As an alternative example, the system may also generate links based at least in part on a determined proximity within a non-Euclidean graph distance or framework between the two or more nodes Of course, in other examples, reducing the amount of data may comprise determining a virtual representation (e.g., a pose) that was never actually traversed or recorded. In such examples, a virtual pose may be selected as a one of a locus of nodes in which a threshold amount of data is represented. E.g., data associated with such a virtual node or representation may be such that it is associated with a threshold amount of data from one or more nearby nodes in a cluster of such nodes (e.g., within a threshold distance—whether physical distance or (weighted) distance in a Euclidean space measured based on a variety of factors relevant to use of the data such as, but not limited to, a geographic location, a covariance of the data, a quantity/density of the data, a number of unique features represented in the data, or the like).

In some cases, a pose may be selected to be included in the factor graph based on a predetermined time interval, as discussed above. In other cases, the system may select a pose for inclusion within the factor graph based on a predetermined Euclidian distance from other nodes along a trajectory, based on a desired node density, as well as other factors. For instance, the graph may have nodes within a range of a desired sensor system. As an example, the nodes may be close enough to each other (e.g., within an Euclidian or physical distance and/or non-Euclidian graph distance), such that the system is able to determine from overlapping sensor data (e.g., the lidar data, camera data, and the like) that two nodes on different trajectories may be connected, as discussed above. Thus, in some examples, the sparsity of the nodes of a graph may be determined based on the quality or range of the sensors systems associated with the autonomous vehicle utilizing the factor graph for navigation. In various examples, such temporal and/or spatial constraints on representative nodes may be related via a typical velocity or speed through which the vehicle traverses between regions associated with the nodes.

In some cases, as nodes associated with multiple overlapping trajectories are input into or consumed by the factor graph, the system may resolve the multiple trajectories into a resulting high definition map that may be more quickly or easily (e.g., less resource intensive) consumed by other systems of the autonomous vehicle (such as localization, perception, panning, etc.). For examples, prior to resolving or optimizing the trajectories, multiple individual nodes associated with different trajectories may be positioned in relative proximity to each other. Thus, in some cases, each node or moment within a predetermined distance may be resolved into a single node and the single node may be utilized during a pose graph optimization technique. For example, each node may comprise a plurality of movements in which the pose (e.g., the 6DOF pose) of each moment is maintained relative to a representative moment. In this manner, subsequent operations may be performed for the node may be limited to the representative moment, thereby reducing operational time and costs. Of course, any other techniques are contemplated, such as, but not limited to bundle adjustments, Simultaneous Localization and Mapping (SLAM), RSLAM, and the like. In some cases, the pose of the new node may be an average pose based on the relative poses of the plurality of the nodes being combined.

In some specific examples, a plurality of nodes or moments may be combined into a single node using a combination of one or more graph distance threshold with one or more geographical or physical (e.g., Euclidian) distance thresholds. As such, the nodes being combined may be tightly related or grouped within the factor graph and tightly spaced within the physical environment. In one particular example, the number of or distance between the nodes of the factor graph may be based on a desired graph distance or physical distance in a final or resulting graph. For instance, the distance of the nodes may result from the particular pose graph optimization technique applied to generate the final or resulting graph. In at least some examples, a metric may be determined, and the nodes generated in the factor graph may be dependent on the evaluation of the metric.

In some cases, an environment may change, such as when a road is built, removed, or rerouted (e.g., during constructions the lanes are often at least temporarily rerouted). In these cases, the system may be configured to check the newly received pose data (and data associated therewith) with the resulting factor graph. In some examples, if greater than or equal to a predetermined number of poses are greater than or equal to a predetermined distance (e.g., physical or Euclidean distance and/or graph distance) from a nearest node of the resulting factor graph, the system may trigger a graph update. In some instances, updating the graph may comprise removing one or more of the plurality of nodes, adding the newly received pose data, and re-optimizing the graph using a pose graph optimization technique. In this manner, the map updating may be automated based on data received while the autonomous vehicles are in operation. In some cases, the graph update may be isolated or limited to a select portion of the graph, such as a graph distance threshold or physical distance threshold from the new pose or new poses. In some examples, the data associated with each node may be maintained, such that the node or moment may be recreated rather than removing the data or node itself. For example, the system may store relative transforms between constituent nodes or moments that are selected to be removed.

Similarly, the system may be configured to decay or remove aging data from the graph. For example, the system may update a node following the receipt or capture of a predetermined number of additional nodes within a graph distance threshold (e.g., (edge distance, Mahalanobis distance, various graph clustering metrics, etc.) and a physical distance threshold (e.g., a Euclidian distance, geographic distance, etc.) of a current node, a quality threshold associated with the sensor data being meet or exceeded (e.g., a point cloud nosiness threshold is met or exceeded), a factor graph quality metric within a region comprising the node being met or exceeded (e.g., a map quality metric, convergence metric, and the like), a semantic feature, a node reaching a predetermined age, an amount of time that has passed (e.g., a predetermine interval has elapsed), or the like.

As an illustrative example, the system may receive five sets or instances of pose data and sensor data representative of the same stretch of roadways, such as a span of a bridge. For each set of five poses, the system may select the most recent pose to insert or add to the graph and/or perform re-optimization on the correspond portion of the factor graph (e.g., removal of the aging node and adding of the selected pose data). In this manner, if the pose data and sensor data associated with a newly added node or trajectory differs from the pose data and sensor data of aging nodes (e.g., the environment has changed), the factor graph may integrate that change as the new nodes and trajectories are added to the graph and/or the aging nodes and trajectories are removed from the graph. In at least some such examples, the nodes may be associated with a weight and data associated with such nodes may be downweighted based on such decay models.

In the cases in which portions of the factor graph are out of date, new data is received, or need to be updated, the system may localize the update around that portion. For instance, by updating nodes from the graph within a graph distance threshold or physical distance threshold of the out of date node and re-optimizing, as discussed above. Additionally, the system may be able to determine the aging portions of the graph based on a location at which two or more nodes have a graph distance of less than or equal to a graph distance threshold but a physical distance of greater than or equal to a physical distance threshold.

As discussed herein, the factor graph representation of the geographic data may be used to improve the overall safety of autonomous vehicles. For example, the sparse representation discussed herein, may be more quickly consumed or utilized by the operational systems of the vehicle, thereby improving the reaction time and operational decision making of the autonomous vehicle.

FIG. 1 is an example block-diagram illustrating an example architecture 100 of a mapping system 102 associated with a plurality of autonomous vehicles, in accordance with implementations of the disclosure. In the illustrated example, sensor systems 104 associated with one or more autonomous vehicles 106 may capture and send sensor data 108 (e.g., environmental data, vehicle pose data, and the like) to the mapping system 102.

The mapping system 102 may also store map data as one or more factor graphs 110 representative of one or more environments. As discussed above, the factor graph 110 may include a plurality of nodes that represent the sensor data 108 at one or more particular moments (e.g., a vehicle pose, at a specific time, at a specific pose, etc.). In some examples, the vehicle may estimate the pose using a Bayesian filter (such as a Kalman filter), bundle adjustment, maximum a posteriori estimation (MAP), and/or SLAM algorithm, as discussed in more detail in U.S. patent application Ser. No. 15/674,853, filed Aug. 11, 2017, the entirety of which is incorporated herein. Individual nodes of the factor graph 110 may be connected based on a shared trajectory and/or based on one or more environmental or sensor data link (e.g., shared landmarks or static objects represented in the sensor data). In this manner, the factor graph 110 may comprise both graph-based links (e.g., nodes are connected based on an analysis of the sensor data 108) and physical position or distance links (e.g., two nodes are physically close in the environment).

In this example, as the mapping system 102 receives additional sensor data 108 from the one or more vehicles 106 traveling within the environment, the mapping system 102 may update the factor graph 110, as discussed above. For example, the mapping system 102 may detect a combination of pose data that is greater than a physical distance threshold or a graph distance threshold from existing nodes of the factor graph 110.

In this example, the mapping system 102 may integrate the newly received pose data as one or more new nodes of the factor graph. The newly added nodes may be connected to each other via a shared trajectory but are otherwise unconnected to the other nodes of the factor graph 110. The mapping system 102 may then apply one or more link evaluation techniques, discussed in more detail below with respect to FIG. 2, to generate links between the existing nodes of the factor graph 110 and the newly added nodes. In some cases, the mapping system 102 may also apply one or more pose graph optimization techniques at least for a position of the factor graph in proximity (e.g., within an updated physical distance threshold or an updated graph distance threshold) to resolve or combine the newly added nodes with one or more existing nodes or with each other to reduce the overall size of the factor graph 110 and maintain the sparse representation. Once a new node is added to represent one or more nodes, the sensor data associated therewith may be combined and/or culled. For example, repetitive, low quality, and/or obsolete sensor data may be deleted—if two sets of sensor data depict the same wall, the lower-grade sensor data may be archived or deleted; if a former set of sensor data depicts a tree or sign that no longer exists that sensor data may be deleted. In some examples, such data may be decayed, downweighted, or otherwise combined (e.g., with an associated covariance) to take inconsistencies into account while preserving the data for some use. Alternatively, the sensor data associated with merged nodes or moments may be maintained based on the relative poses of a representative moment of the node and the other merged moments or nodes. In one example, a relative transform between the representative node and the other moments of the node may be maintained by the system. In this manner, future operations may be performed on the representative moment or node in lieu of preforming operations on each moment of the node, thereby improving processing time and reducing processing resources without detecting or culling the data from the factor graph.

In the current example, the newly updated factor graph 110 may then be used for indexing sensor data (and/or representations thereof—meshes, features, keypoints, etc.) and/or the most recently generated representation of the environment. When new pose data and sensor data is received from a vehicle that corresponds to a representative node, the system may retrieve the sensor data and/or most recent representation associated with that node instead conducting a pose graph estimation over all of the former nodes. This may simplify the process of updating and/or retrieving the environment representation based on the new sensor data.

In some cases, the factor graph 110 and/or a trajectory 112 or other type of navigation product may be determined by the mapping system 102 using the factor graph 110 and provided back to the vehicles 106.

Figure 2:
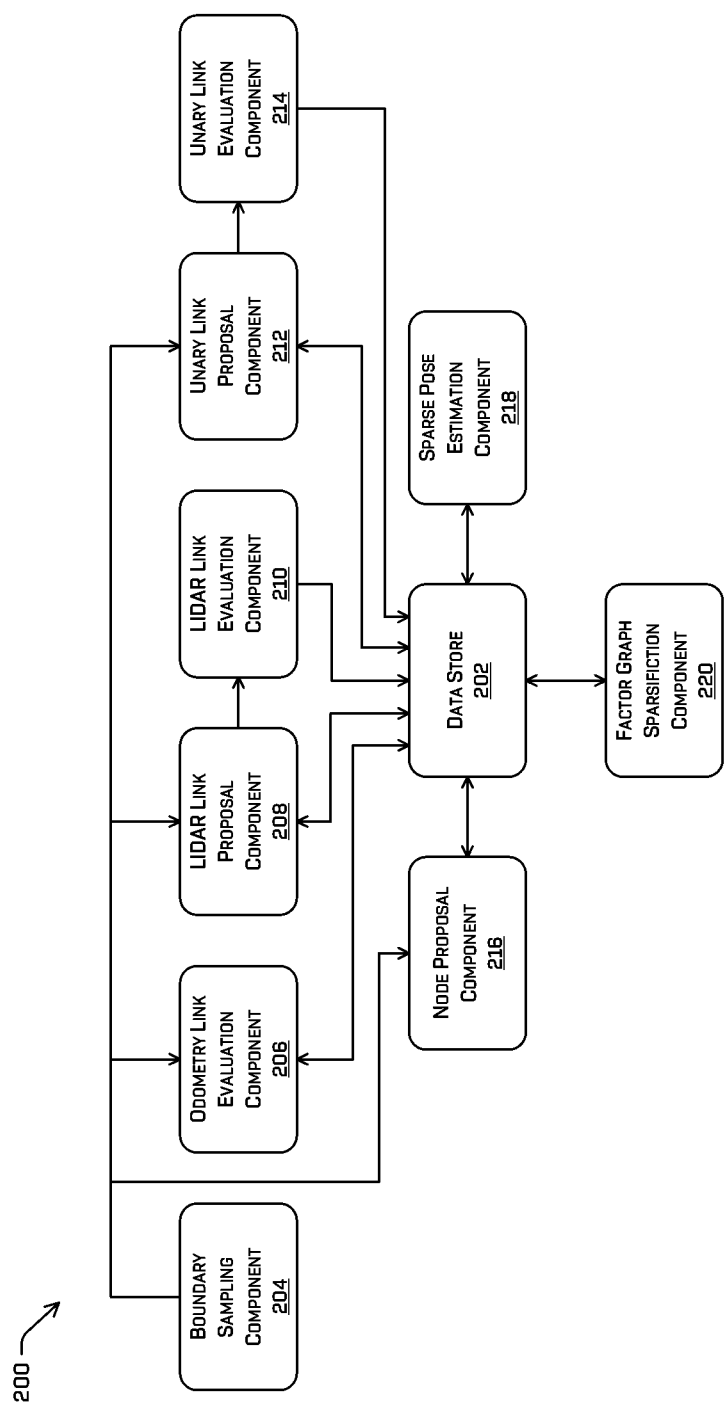
FIG. 2 is a block-diagram illustrating an example architecture of a mapping system of FIG. 1, in accordance with implementations of the disclosure.

FIG. 2 is another example block-diagram illustrating an example architecture 200 of a mapping system 102 of FIG. 1, in accordance with the implementations of the disclosure. In the current example, a data store 202 may maintain or otherwise manage one or more factor graphs representative of one or more physical environments. Individual nodes of the factor graph may be removed, updated, or merged/combined with other nodes as additional sensor data (e.g., pose data and environmental data, and the like) are received from operational vehicles. The individual nodes may be removed, updated, or merged/combined based on the output of a number of components, such as boundary sampling component 204, odometry link evaluation component 206, lidar link proposal component 208, lidar link evaluation component 210, unary link proposal component 212, and unary link evaluation component 214.

In the illustrated architecture 200, each of the components 204-214 may operate independently as parallel operations to maintain and update the factor graphs stored by the data store 202. As one illustrative example, when sensor data is received, the boundary sampling component 204 may determine a region of interest associated with a set of sensor data received from operational vehicles. In some examples, the region of interest may correspond to a portion of a global map that has previously been mapped or for which no map or environmental representation yet exists. The region of interest may estimate an extent of the geographic region identified in the sensor data. The region of interest as well as the sensor data may be provided or received at a node proposal component 216. The node proposal component 216 may propose or otherwise generate a set of potential nodes along a trajectory associated with the senor data. Such nodes may comprise any number of poses determined based at least in part on data available to the vehicle or subsets thereof, including virtual nodes in between nodes. In some cases, the node proposal component 216 may determine that the region of interest has less than a desired number of nodes (e.g., an associated metric is used to determine that the data of associated nodes only provides less than or equal to a threshold confidence level for pose determination) or does not already exist with respect to the factor graph and, in response, add at least a portion of the potential nodes to the factor graph maintained by the data store 202. In additional or alternate examples, the node proposal component 216 may determine that at least a portion of the region of interest overlaps a portion of a factor graph maintained by the data store 202. In such an instance, anode may be determined in association with anode that already exists in the factor graph. Such a node may be a candidate to be merged with the existing node according to the techniques discussed herein.

In some cases, the odometry link evaluation component 206 may evaluate within the region of interest odometry data included in the sensor data to determine links or connections between the newly added nodes along a trajectory. In this example, the links or connections generated by the odometry link evaluation component 206 may be associated with a single vehicle and a single set of sensor data along a shared trajectory, as discussed above. Such odometry links, as described in detail herein, may be representative of a distance traveled between successive (or non-successive) nodes and an expected amount of overlap of data. As a non-limiting example, if lidar data is covisible around a 360 degree field of view for 150 meters (or other predetermined threshold distance) and the vehicle pose differs by less than 150 meters (or other predetermined threshold distance) between nodes as indicated by odometry data, some portion of lidar data should overlap between measurements.

As discussed above, the newly added nodes may be unconnected to other nodes of the factor graph maintained by the data store 202. In this example, the lidar link proposal component 208 may, based on the region of interest, propose links or connections between existing nodes and the newly added nodes (e.g., between nodes along different trajectories) or between two newly added nodes. The proposed links may then be evaluated by the lidar link evaluation component 210. For instance, the lidar link evaluation component 210 may evaluate the proposed links based on the received lidar data. As some illustrative examples, the lidar link evaluation component 210 may preform voxel covariance alignment, anxious search alignment, iterative closest point algorithms, or the like to evaluate the proposed links and add the passing links to the factor graph. Such links may indicate a likelihood that two different sets of sensor data are associated with a same portion of an environment. Such a link may comprise a transform or any other indication of a relation between a first set of sensor data and a second set of sensor data. As an illustrative example, details of voxel covariance alignment operations are discussed in U.S. application Ser. Nos. 16/722,598 and 16/722,771, both of which are incorporated herein by reference in their entirety.

The newly added nodes may also be linked or connected to other nodes by the unary link proposal component 212 and the unary link evaluation component 214. For example, the unary link proposal component 212 may, within the region of interest, determine links or connections based on vehicle pose data of various nodes and the unary link evaluation component 214 may evaluate the proposed links prior to adding the links to the factor graph.

In the illustrated example, a sparse pose estimation component 218 and/or the factor graph sparsifiction component 220 may be configured to collect moments or candidate nodes into clusters representative by a single moment as a node of the factor graph. For example, a set of nodes or moments may be grouped or combined by the sparse pose estimation component 218 and/or the factor graph sparsification component 220 such that a representative moment or node is selected and transforms between the pose of the other moments or nodes and the representative moment or node are stored with respect to the factor graph. In various examples, such additional nodes may trigger a pose graph optimization/relaxation to minimize an amount of uncertainty (or otherwise) associated with such nodes and associated data/map.

Figure 3:
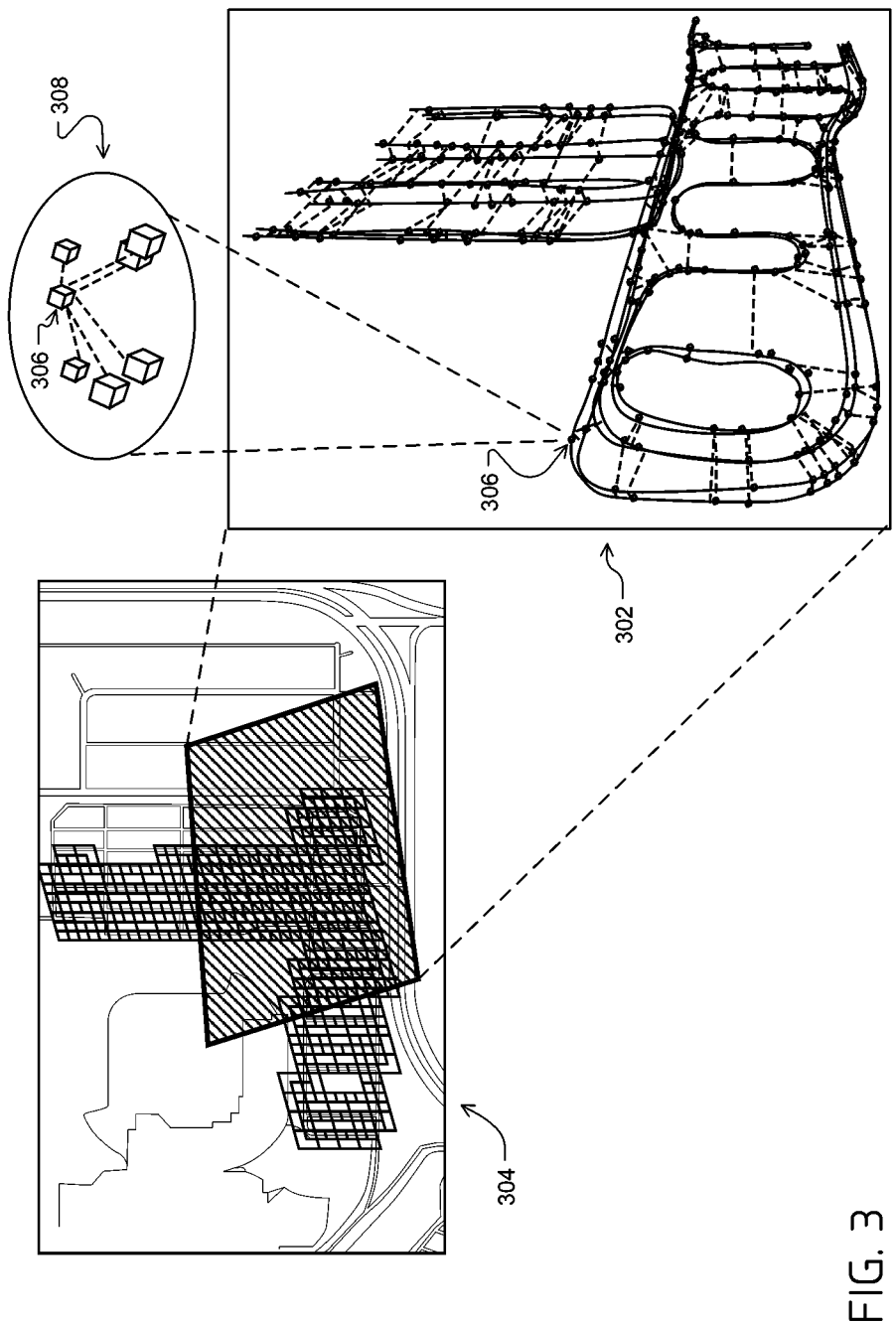
FIG. 3 is an example illustrating a sparse representation of a physical region, in accordance with implementations of the disclosure.

FIG. 3 is an example illustrating a sparse representation 302 of a physical region 304, in accordance with implementations of the disclosure. In the illustrated example, the physical region 304 may represent a parking lot as shown. The parking lot may be traversed by various autonomous vehicles. Each of the vehicles may collect sensor data (e.g., pose data and environmental data, and the like) with respect to the parking lot. A mapping system, such as mapping system 102 of FIG. 1, may then generate the sparse representation 302 in the form of the factor graph, as illustrated.

In the current example, the sparse representation 302 may include a plurality of nodes having links or connections between them. In this example, the solid links may represent nodes that are associated with a shared trajectory and the dashed links may represent graph links added by, for instance, the unary link components or the lidar link components of FIG. 2. Thus, the dashed lines may represent graph links between nodes of different trajectories and the solid lines may represent links between nodes along the same trajectories.

In the current example, one or more of the illustrated nodes, such as node 306, may comprise a plurality of moments, generally indicated by 308. Each moment may comprise pose data (6DOF pose of a vehicle) and sensor data (e.g., lidar data, red-green-blue image data, radar data, thermal data, and the like). A location of the individual moments of a particular node may be maintained by the factor graph as a relative pose between the individual moment and the representative moment of the node (e.g., the moment presented by the factor graph and linked to the other nodes).

Figure 4:
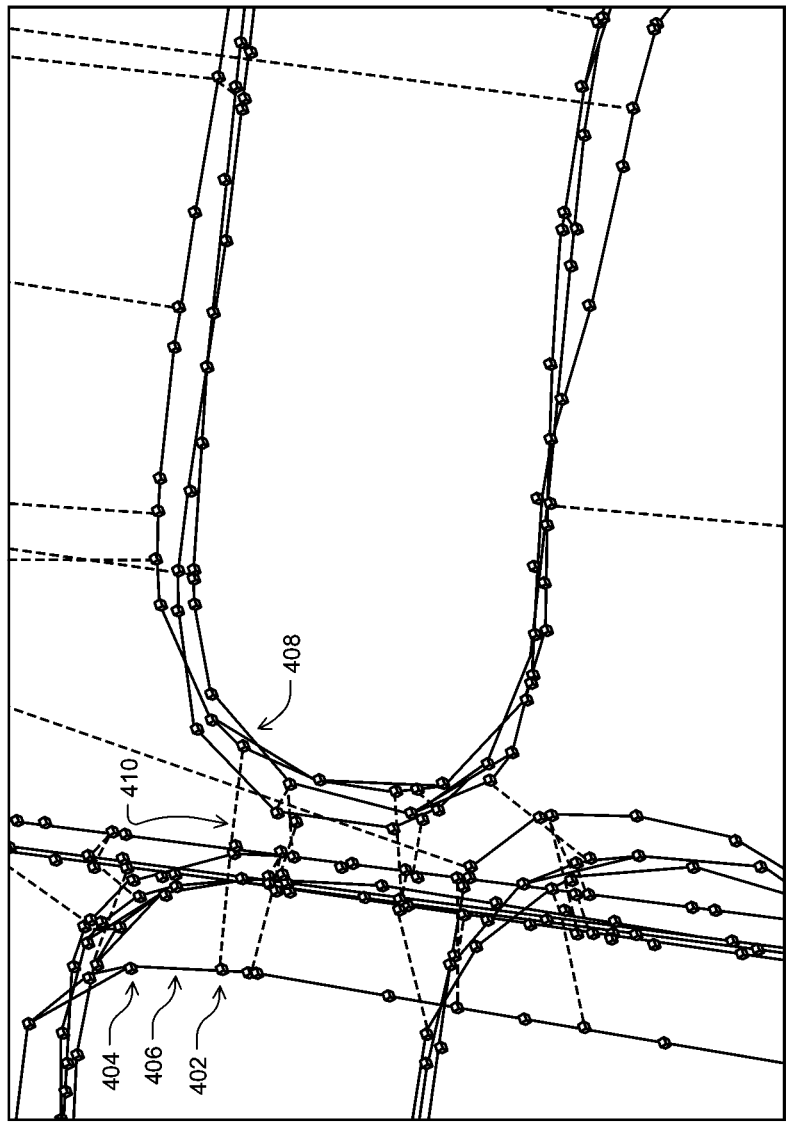
FIG. 4 is an example illustrating a portion of the sparse representation of FIG. 3, in accordance with implementations of the disclosure.

FIG. 4 is an example illustrating a portion 400 of the sparse representation 302 of FIG. 3, in accordance with implementations of the disclosure. Again, as discussed above, the sparse representation 302 may comprise a plurality of nodes that represent a combination of pose data and environmental data at a given physical position and at a given time. For example, each node may include a plurality of moments each having an associated pose data and environmental data at a given physical position and at a given time.

In the current example, individual nodes may be connected or linked together. In the illustrated example, a first node 402 is shown. The first node 402 is connected to a second node 404 via a first link 406. The first link 406 may represent a shared trajectory within the physical space traversed by an autonomous vehicle that captured the sensor data (e.g., the pose data and environmental data) associated with the first node 402 and the sensor data associated with the second node 404.

In the current example, the first node 402 may also comprise a link to a third node 408 via a second link 410. The second link 410 may represent a graph link or a non-Euclidian distance measurement. For instance, the sensor data, such as image or lidar data of the environment, associated with the first node 402 and the third node 408 may include overlapping static objects or other environmental details, such that the mapping system is able to determine that the sensor data associated with both the first node 402 and the third node 408 represent the same area and, thus, the second link 410 should be generated. In this example, the graph links, such as second link 410, may assist with connecting separate trajectories or factor graphs to each other to form a unified global factor graph of a larger environment. For instance, in the illustrated example, the trajectories associated with the third node 408 are unconnected with the trajectories associated with the first node 402 and the second node 404. However, the first node 402 and the third node 408 are relatively close in physical distance, as shown. Thus, the graph links, such as second link 410, may be utilized to align and/or combine distinct factor graphs together. As other examples, system may also link nodes, such as the node 402 and the node 408, based at least in part on shared unary global factors derived from GPS data, map localization data, or other geographic based position data, preforming association and/or loop closure operations between the environmental or sensor data (e.g., image data, lidar data, radar data, and the like) between two nodes 402 and 408, by matching the environmental or sensor data of the nodes 402 and 408 based at last in part on existing or preexisting map data or road networks, on a determined proximity within a Euclidean distance or framework between the relative pose data of the node 402 and 408, a determined proximity within a non-Euclidean graph distance or framework between the nodes 402 and 408.

Figure 5:
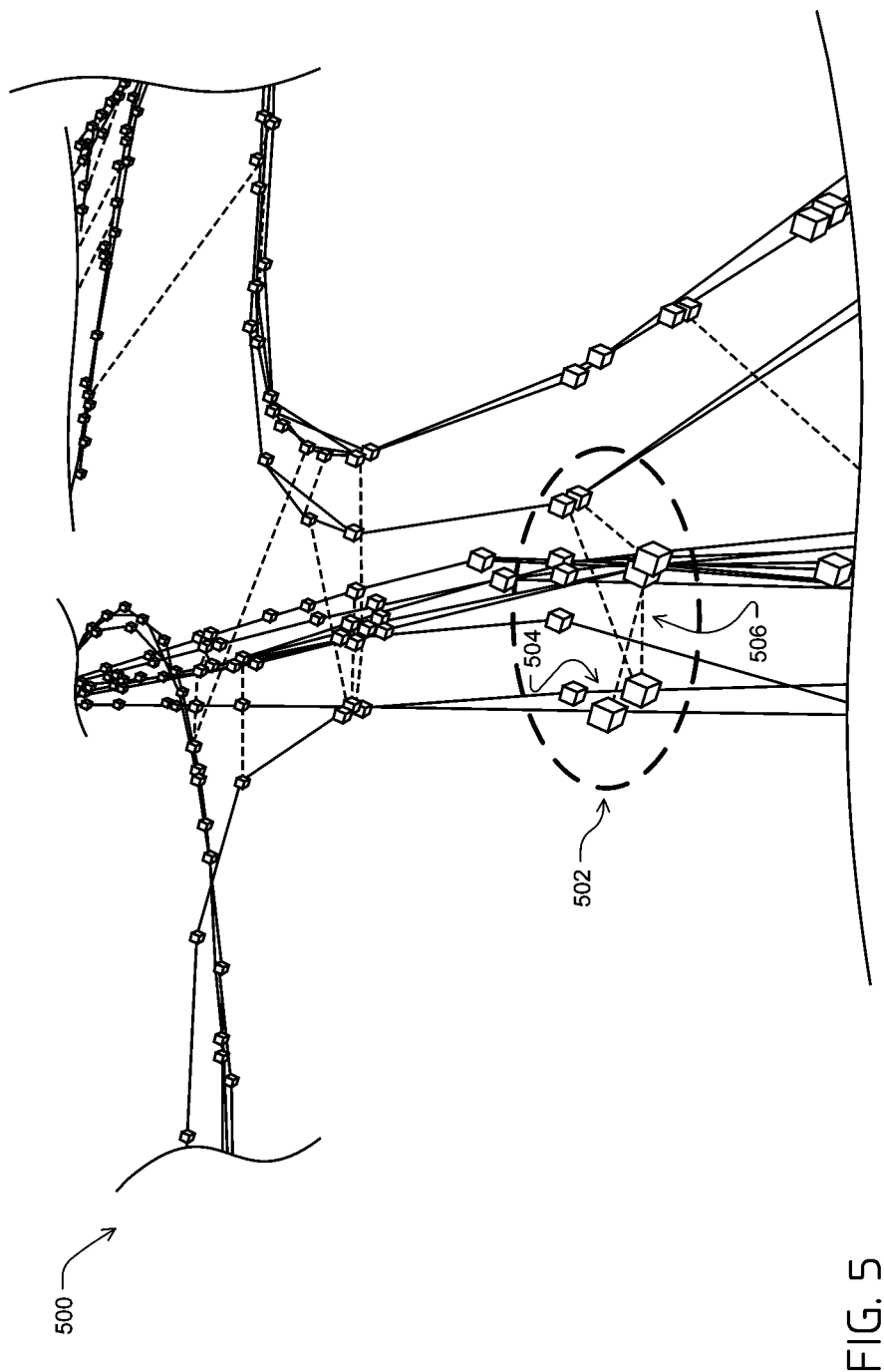
FIG. 5 is another example illustrating a portion of the sparse representation of FIG. 3, in accordance with implementations of the disclosure.

FIG. 5 is another example illustrating a portion 500 of the sparse representation 302 of FIG. 3, in accordance with implementations of the disclosure. In the current example, the sparse representation 302 may comprise more than a desired number of nodes within a region indicated by 502. For instance, multiple vehicles may have captured sensor data that resulted in nodes being placed in close proximity to each other. In this example, the mapping system may identify that more than a threshold number of nodes are within a predetermined graph distance or a predetermined physical distance (as represented by the links 504 of a physical distance and the links 506 of other types of measurements, such as covisibility within lidar data).

In this example, the mapping system may collapse the nodes of the portion 500 and/or to the region 502 and apply a pose graph optimization technique to reduces uncertainty by adjusting poses throughout the graph. In some cases, the pose of the representative node may be a pose selected based on the relative poses of the plurality of the nodes being combined. In various examples, a representative node may be created which is representative of a threshold amount of information associated with one or more other nodes of a cluster of nodes.

In one particular example, after the nodes of the region 502 are clustered, a single representative node may remain in the region 502 of the factor graph and comprise the data associated with each of the original nodes within the region 502. The representative node may also comprise or maintain each of the external link associated with the individual original nodes (e.g., each link between a node within the region 502 and a node outside of the region 502 are maintained), as well as all of the data associated therewith.

In some cases, the representative node may comprise the data associated each of the original nodes as well as the links between the original nodes. In these cases, the relative pose of the original nodes with respect to the representative node may be maintained within the cluster. For example, a relative transform may be stored with respect to the representative node and the other nodes of the cluster. In this manner, only the representative node may be used when performing additional pose graph optimization technique or collapsing events. For example, additional nodes may be inserted into the factor graph proximate to the resulting node. In some instances, the number of additional nodes and the representative node may again meet or exceed a threshold and the system may again collapse a region including the representative node. In this second round, only the representative node may be processed, as a pose of the remaining original nodes is maintained relative to the representative node.

Figure 6:
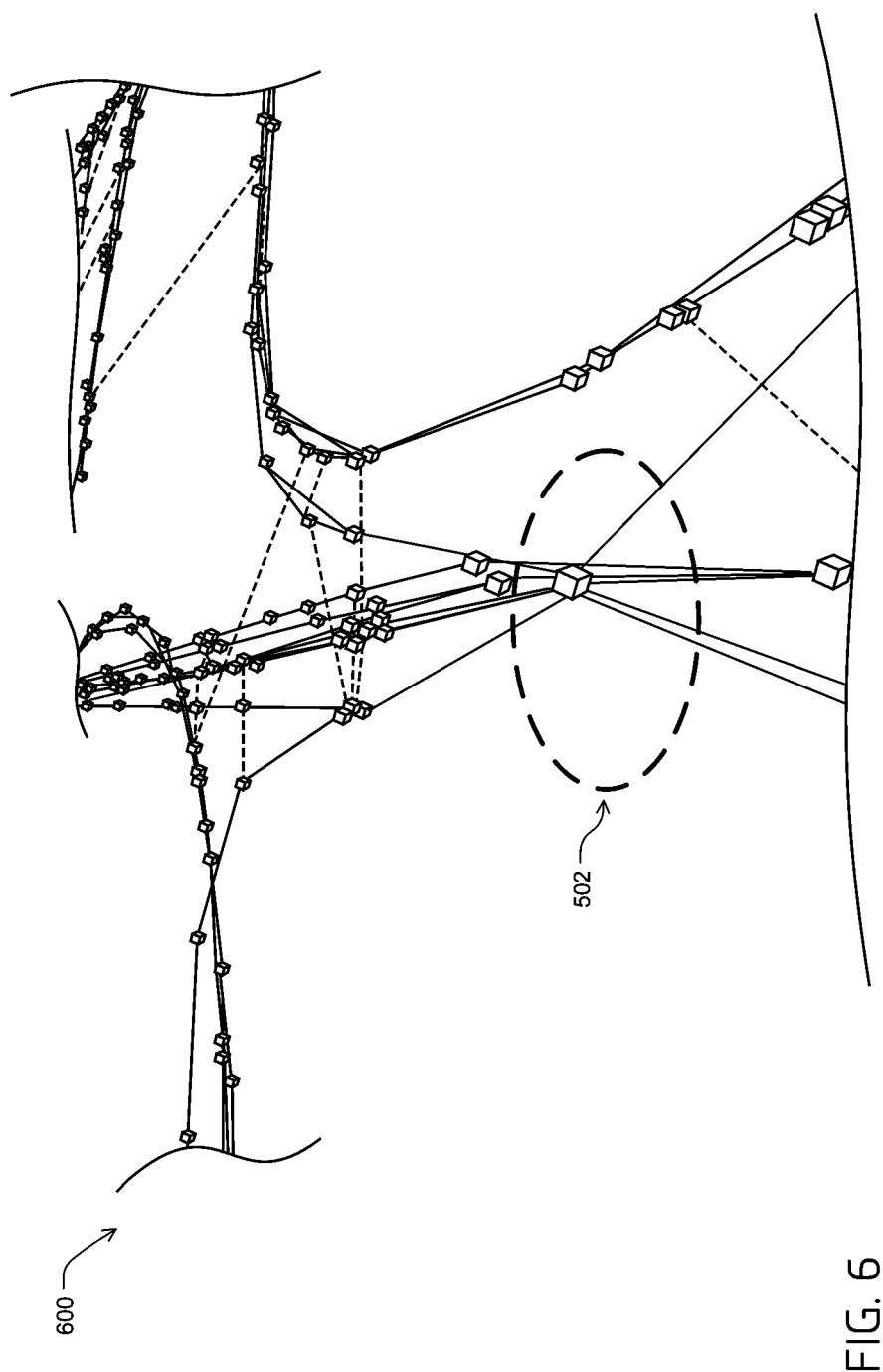
FIG. 6 is an example illustrating a resulting factor graph after the nodes within the region of FIG. 5 have been collapsed, in accordance with implementations of the disclosure

FIG. 6 is an example illustrating a resulting factor graph 600 after the nodes within the region 502 of FIG. 5 have been collapsed, in accordance with implementations of the disclosure. As discussed above, overlapping or multiple factor graphs and/or nodes of the factor graph may be clustered or otherwise combined to provide a resulting factor graph 600 that has nodes that are represented sparsely (e.g., greater than a physical distance threshold and/or a graph distance threshold) from each other. The resulting factor graph 600 may then be used to generate planned trajectories or paths for use by the autonomous vehicles during navigation form a starting location to a destination.

FIGS. 7-12 are flow diagrams illustrating example processes associated with the live stream events as discussed above. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 7:
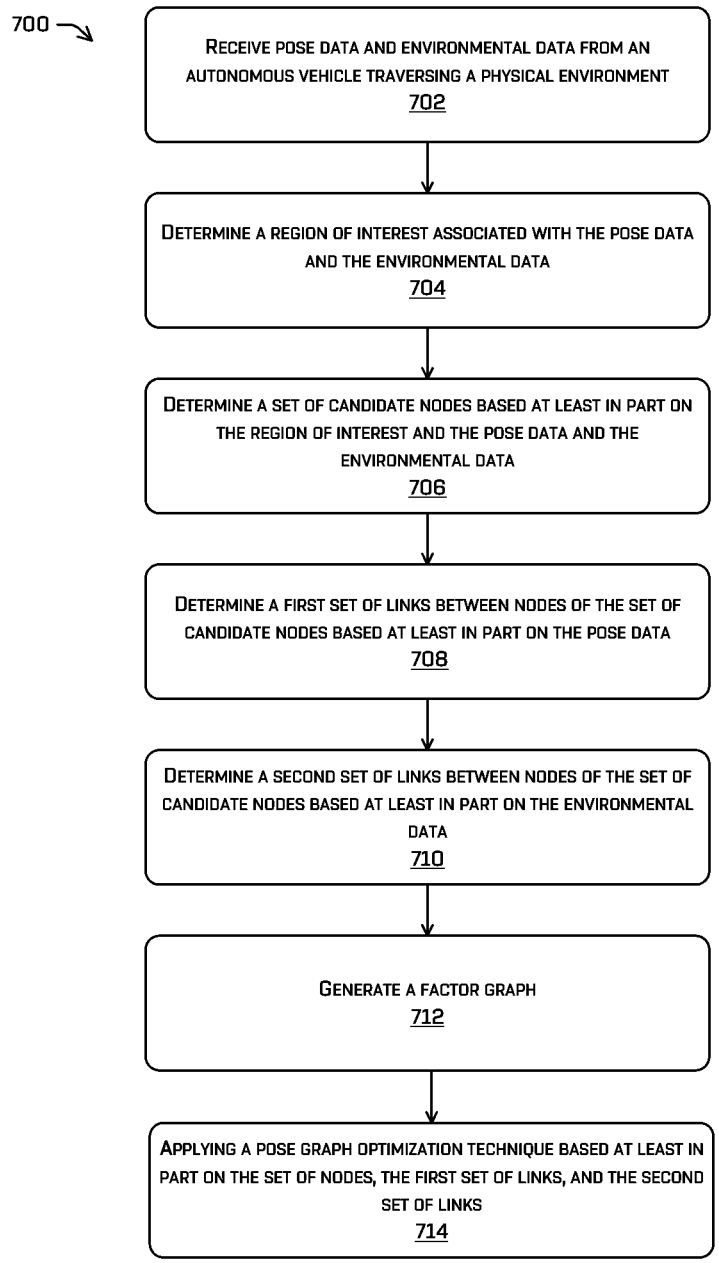
FIG. 7 is a flow diagram illustrating an example process associated with initializing a sparse representation of a physical environment, in accordance with implementations of the disclosure.

FIG. 7 is a flow diagram illustrating an example process 700 associated with initializing a sparse representation of a physical environment, in accordance with implementations of the disclosure. As discussed above, an autonomous vehicle may be configured to capture sensor data as the vehicle traverses through the physical environment. The captured sensor data may be fused or combined with sensor data from other vehicles or systems to generate a map. However, storing all the sensor data associated with an environment may result in a very large resource intensive map that is not suitable, in all cases, for autonomous vehicle navigation. The process 700 discusses one method of storing the map data as a sparse representation or factor graph that may be more quickly and easily consumed by the systems of autonomous vehicles.

At 702, a mapping system may receive pose data, and environmental data from an autonomous vehicle traversing a physical environment. In some cases, the pose data may represent a 6DOF pose of the vehicle at a given or particular time and at a given or particular location. The pose data may include an associated trajectory that may comprise a path taken by the vehicle as the vehicle traverses the environment from a first pose to a second pose and so forth. In some cases, the environmental data may comprise image data, thermal data, lidar data, and the like.

At 704, the mapping system may determine a region of interest associated with the pose data and the environmental data. In some examples, the mapping system may determine a region of interest with respect to an existing or global factor graph or sparse representation of the physical environment. For instance, the region of interest may correspond to a geographic region associated with the pose data and the environmental data.

At 706, the mapping system may determine a set of candidate nodes (or moments) based at least in part on the region of interest and the pose data and the environmental data. For example, nodes may be generated based on the pose data and a time interval, such that, as the vehicle travels, each node corresponds to a pose of the vehicle at the time interval. In other examples, the nodes may be generated based on the pose data and a physical distance interval, such that each node corresponds to a pose of the vehicle after the vehicle has traversed a threshold distance. In some cases, the time interval may be based on a time interval associated with one or more sensor systems in the vehicle and/or the distance thresholds may be based on a range of one or more sensor systems of the vehicle. In various examples, such nodes may be within a threshold distance of each other using some other metric (e.g., a Euclidian distance between features associated with the data associated with the nodes).

At 708, the mapping system may determine a first set of links between the nodes of the set of candidate nodes based at least in part on the pose data. For example, the mapping system may link consecutive nodes along the trajectory or planned path of a vehicle. In this manner, each of the nodes generated from sensor data corresponding to a continuous drive time of a vehicle may be linked using the pose data and/or a trajectory of the vehicle. In some cases, the first set of links may represent a physical (e.g., Euclidian) distance link using, for instance, the pose data and/or odometry data.

At 710, the mapping system may determine a second set of links between nodes of the set of candidate nodes based at least in part on the environmental data. For example, the mapping system may identify overlapping static objects or landmarks within lidar data and/or image data associated with two or more of the candidate nodes. In some cases, each link of the second set of links may be evaluated using the pose data to assist in ensuring that quality valid links are established between the candidate nodes.

As other examples, mapping system may also link candidate nodes based at least in part a determined shared unary global factors derived from GPS data, map localization data, or other geographic based position data. The mapping system may link candidate nodes based on preforming association and/or loop closure operations between the environmental data (e.g., image data, lidar data, radar data, and the like) between two nodes. In one particular example, the mapping system may determine links by matching the environmental data of a particular candidate nodes based at last in part on existing or preexisting map data or road networks.

At 712, the mapping system may generate a factor graph and, at 714, the mapping system may apply a pose graph optimization technique based at least in part on the set of candidate nodes, the first set of links, and the second set of links, as discussed above. In some cases, the factor graph may be used to generate future trajectories or planned paths for a vehicle between a starting location and a destination.

Figure 8:
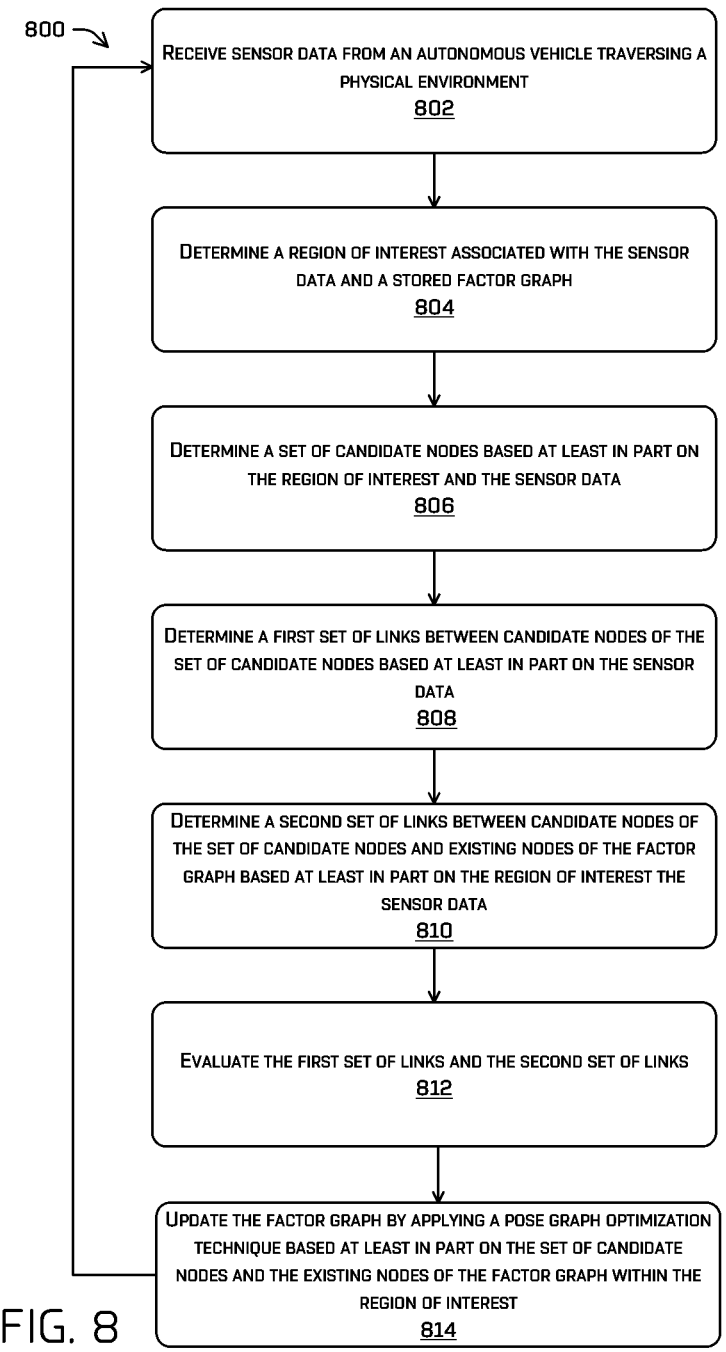
FIG. 8 is a flow diagram illustrating an example process associated with updating a sparse representation of a physical environment, in accordance with implementations of the disclosure.

FIG. 8 is a flow diagram illustrating an example process 800 associated with updating a sparse representation of a physical environment, in accordance with implementations of the disclosure. In some cases, a geographic or physical region may already have an existing or associated factor graph (e.g., the geographic region has been previously traversed by one or more vehicles). In this example, a mapping system may integrate or combine the newly captured sensor data with the existing factor graph.

At 802, a mapping system may receive sensor data from an autonomous vehicle traversing a physical environment. In some cases, the sensor data may include pose data, trajectory, lidar data, image data, thermal data, odometry data, and the like.

At 804, the mapping system may determine a region of interest associated with the sensor data and a stored factor graph associated with the physical environment. In some examples, the mapping system may determine a region of interest as the geographic region of the factor graph associated with the sensor data.

At 806, the mapping system may determine a set of candidate nodes (or moments) based at least in part on the region of interest and the sensor data. In some examples, nodes may be generated based on the pose data and/or IMU data and a time interval. For instance, the candidate nodes may be generated based on pose data at various time intervals or distance thresholds, such that as the vehicle travels nodes may be generated along the trajectory at period positions. In some cases, the candidate nodes may be generated based on graph distance thresholds or physical distance thresholds with respect to existing nodes of the factor graph.

At 808, the mapping system may determine a first set of links between candidate notes of the set of candidate nodes based at least in part on the sensor data. For instance, the mapping system may link consecutive nodes along the trajectory or planned path of a vehicle using pose data, IMU data, odometry data, and the like. As discussed above, each of the candidate nodes may be linked to represent a continuous drive trajectory of a vehicle capturing the sensor data. The candidate nodes may also be linked using detected static objects within lidar data and/or image data as discussed above.

At 810, the mapping system may determine a second set of links between candidate nodes of the set of candidate nodes and existing nodes of the factor graph based at least in part on the region of interest and the sensor data. For example, the mapping system may link existing nodes to candidate nodes in response to determining the lidar data and/or image data represent the same static objects or environment features. In some cases, the links between the existing nodes and the candidate nodes may be used to assist in geographically aligning the candidate nodes with the factor graph.

At 812, the mapping system may evaluate the first set of links and the second set of links. For instance, the links may be evaluated using various techniques, such as voxel convolution, anxious search alignment, or the like.

At 814, the mapping system may update the factor graph by applying a pose graph optimization technique based at least in part on the set of candidate nodes and the existing nodes of the factor graph within the region of interest. In some cases, the mapping system may select a representative node for the set of a candidate nodes and the existing nodes of the factor graph within the region of interest. In some cases, the nodes may be selected based at least in part on age of the nodes, a quality of the sensor or environmental data associated with the nodes, a semantic nature of the nodes, and the like.

Figure 9:
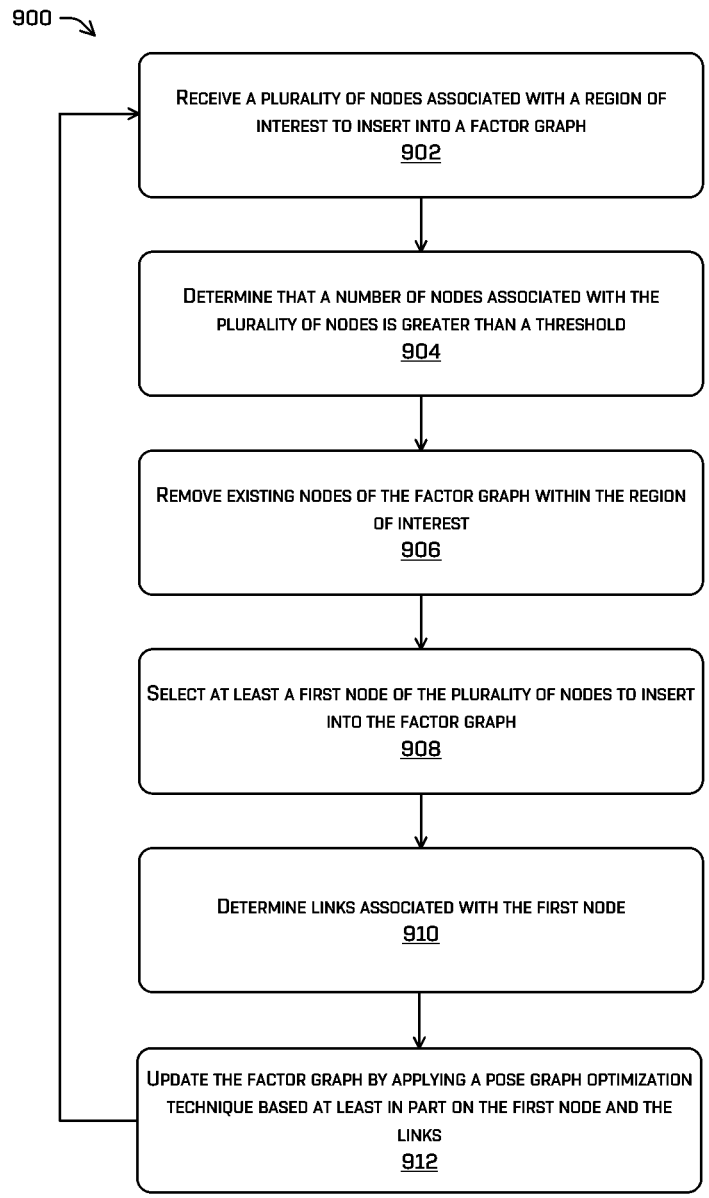
FIG. 9 is another flow diagram illustrating an example process associated with updating a sparse representation of a physical environment, in accordance with implementations of the disclosure.

FIG. 9 is another flow diagram illustrating an example process 900 associated with updating a sparse representation of a physical environment, in accordance with implementations of the disclosure. In some cases, various data associated with the factor graph may age or become out of date over time. For example, a street may be rerouted, upgraded or otherwise changed. In these cases, the map or factor graph should be updated to remove the aging or out of date nodes.

At 902, a mapping system may receive a plurality of nodes associated with a region of interest to insert into a factor graph. For example, the plurality of nodes may include one or more candidate nodes associated with newly captured sensor data and selected, evaluated, and linked as discussed herein.

At 904, the mapping system may determine that a number of nodes associated with the plurality of nodes is greater than a threshold. For example, the mapping system may be configured to trigger an update to the nodes and/or other data associated with the factor graph in response to a new set of nodes associated with a region exceeding or otherwise meeting a threshold. In this manner, the mapping system may initiate automatic updates on local regions of the factor graph when sufficient new sensor data is available for that region.

At 906, the mapping system may remove or otherwise trim existing nodes of the factor graph within the region of interest. For example, the nodes and associated data may be purged or otherwise deleted from the factor graph. In some cases, the mapping system may be configured to decay or remove aging data from the graph following the receipt or capture of a predetermined number of additional nodes within a graph distance threshold (e.g., (edge distance, Mahalanobis distance, various graph clustering metrics, etc.) and a physical distance threshold (e.g., a Euclidian distance, geographic distance, etc.) of a current node. In other examples, the mapping system may select nodes for removal based at least in part on a quality threshold associated with the sensor data being meet or exceeded (e.g., a point cloud nosiness threshold is met or exceeded), a factor graph quality metric within a region comprising the node being met or exceeded (e.g., a map quality metric, convergence metric, and the like), a semantic feature, a node reaching a predetermined age, an amount of time that has passed (e.g., a predetermine interval has elapsed), and/or a combination thereof.

At 908, the mapping system may select at least a first node of the plurality of nodes to insert into the factor graph. In some cases, the number of nodes selected may be based at least in part on the size of the region of interest, a minimum amount of data required to ensure a threshold confidence for localization at any point between nodes, a number of nodes removed with respect to 906, or the like. In other cases, the mapping system may evaluate each of the plurality of nodes and select a predetermined number of nodes having the highest quality pose data, environmental data, and the like.

At 910, the mapping system may determine links associated with the first node as well as any other nodes inserted into the region. As discussed above, the mapping system may generate links associated with links of physical distances (e.g., based on shared trajectories) and links associated with graph factors, such as in response to detecting matching lidar or image data.

At 912, the mapping system may update the factor graph by applying a pose graph optimization technique based at least in part on the first node and the links. In this example, the update may be localized to the region of interest to reduce the processing time and resources associated with a map or factor graph update.

Figure 10:
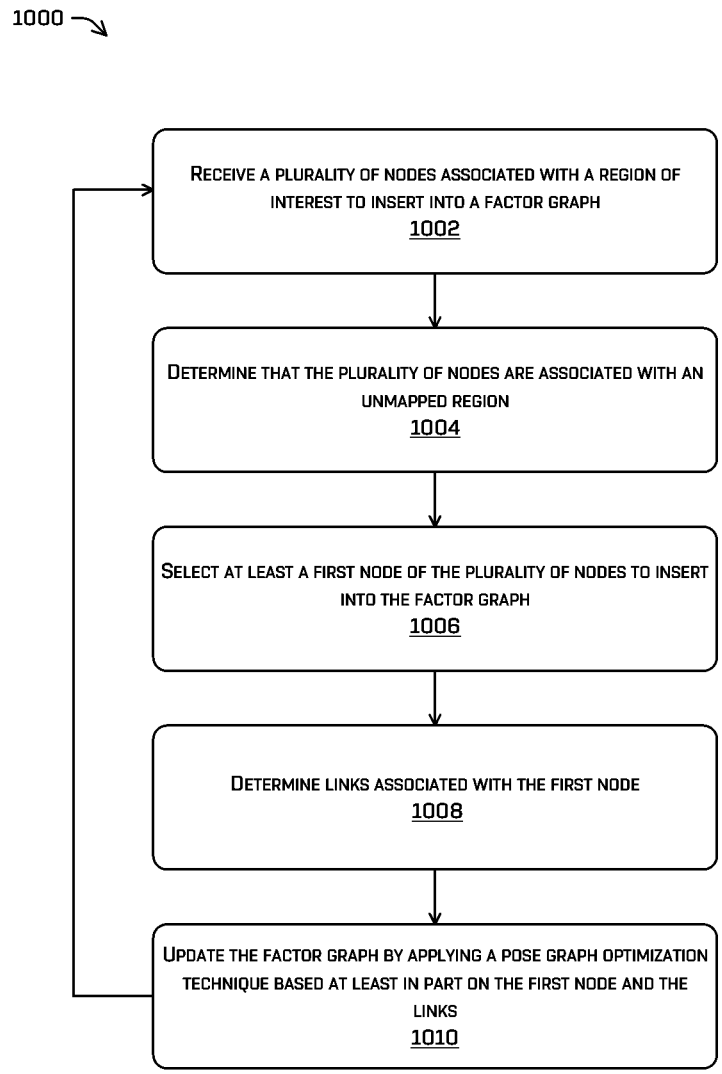
FIG. 10 is another flow diagram illustrating an example process associated with updating a sparse representation of a physical environment, in accordance with implementations of the disclosure.

FIG. 10 is another flow diagram illustrating an example process 1000 associated with updating a sparse representation of a physical environment, in accordance with implementations of the disclosure. In some instances, the mapping system may receive sensor data associated with unexplored or unmapped regions. For example, a new road, parking lot, or other path may be constructed.

At 1002, a mapping system may receive a plurality of nodes associated with a region of interest to insert into a factor graph. For example, the plurality of nodes may include one or more candidate nodes associated with newly captured sensor data and, again, selected, evaluated, and linked as discussed herein.

At 1004, the mapping system may determine that the plurality of nodes are associated with an unmapped region. For example, the mapping system may determine the plurality of nodes are greater than a threshold distance (e.g., graph distance and/or physical distance) from existing nodes of the factor graph. As an example, if a new road is constructed at least one of the nodes generated from the corresponding sensor data may be greater than the threefold distance from other existing nodes of the factor graph. In this manner, the distance threshold may be used to trigger a graph update to add the newly scanned region of interest to the global map or graph. As other examples, the mapping system may trigger a graph update for an unmapped region based at least in part on one or more unary global factors derived from GPS data, map localization data, or other geographic based position data meeting or exceeding a threshold. As another example, the mapping system may trigger a graph update based at least in part on a quality metric, convergence metric, or the like associated with the region of the factor graph, an edge distance, a Mahalanobis distance, one or more graph clustering metrics, or the like meeting or exceeding a threshold. At 1006, the mapping system may select at least a first node of the plurality of nodes to insert into the factor graph. In some cases, the number of nodes selected may be based at least in part on the size of the region of interest, the number of nodes associated with the plurality of nodes, or the like. In other cases, the mapping system may evaluate each of the plurality of nodes and select a predetermined number of nodes having the highest quality pose data, environmental data, and the like.

At 1008, the mapping system may determine links associated with the first node as well as any other nodes inserted into the region of interest. As discussed above, the mapping system may generate links associated with links of physical distances (e.g., based on shared trajectories) and links associated with graph factors, such as in response to detecting matching lidar or image data.

At 1010, the mapping system may update the factor graph by applying a pose graph optimization technique based at least in part on the first node and the links. In this example, the update may be localized to the region of interest to reduce the processing time and resources associated with a map or factor graph update. For example, the mapping system may cluster or group a set of nodes or moments, as discussed above, to store relative transforms between the pose data of the nodes of the cluster and a representative node.

Figure 11:
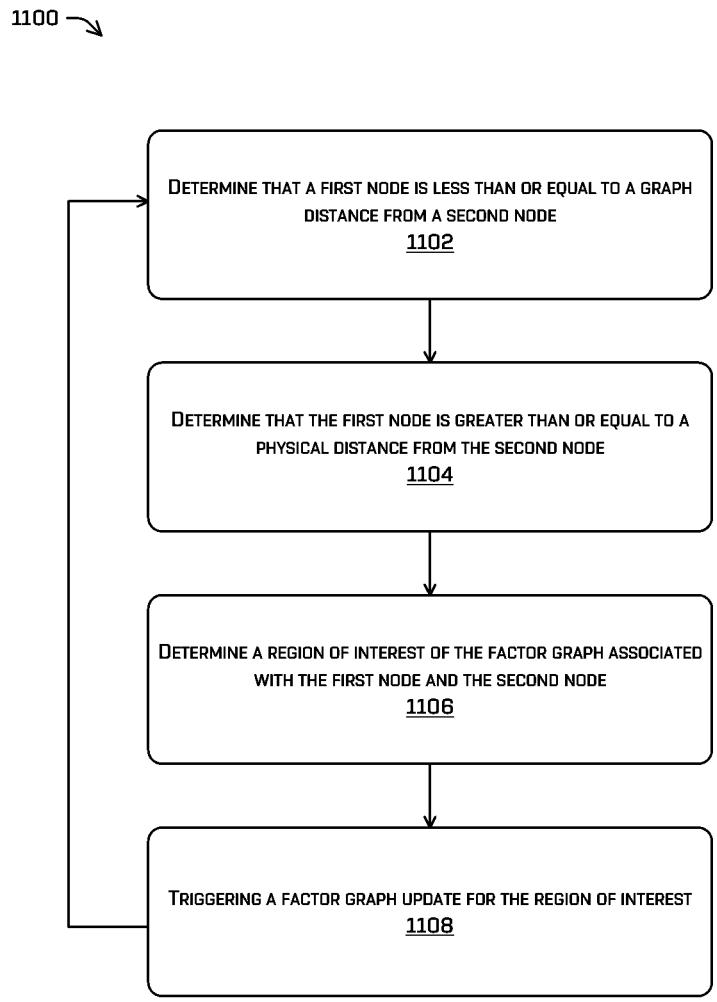
FIG. 11 is a flow diagram illustrating an example process associated with triggering an update to a sparse representation of a physical environment, in accordance with implementations of the disclosure.

FIG. 11 is a flow diagram illustrating an example process 1100 associated with triggering an update to a sparse representation of a physical environment, in accordance with implementations of the disclosure. In some cases, two regions of the global factor graph or map may be relatively close in physical proximity but remain unlinked or unconnected, such as when a building, wall, or other obstacle is located between the nodes of the two regions. In these cases, the mapping system may be able to identify the two regions and trigger a map update to attempt to further connect the two physically proximate regions within the factor graph.

At 1102, the mapping system may determine that a first node is less than or equal to a graph distance (whether or not a physical or Euclidian distance) from a second node. For instance, the first node and the second node may both be linked to a third node based on shared static objects visible between the first node and the third node and/or the second node and the third node.

At 1104, the mapping system may determine that the first node is greater than or equal to a physical distance from the second node. For example, no vehicle may have traversed a direct path between the first node and the second node, resulting in the factor graph representing the first node and the second node at a large physical distance from each other.

At 1106, the mapping system may determine a region of interest of the factor graph associated with the first node and the second node. For instance, the mapping system may determine a radius or diameter about a center point between the first node and second node to include in the region. In other cases, the mapping system may select a graph distance threshold and a physical distance threshold around the first node and the second node and include each node within the graph distance threshold and/or the physical distance threshold as part of the region of interest.

At 1108, the mapping system may trigger a factor graph update for the region of interest. For example, the mapping system may trigger the factor graph update based at least in part on the first node being less than or equal to the graph distance threshold and greater than or equal to the physical distance threshold. In some cases, the factor graph update for the region of interest may be to attempt to physically relate the first node to the second node in a way more representative of the physical world.

Figure 12:
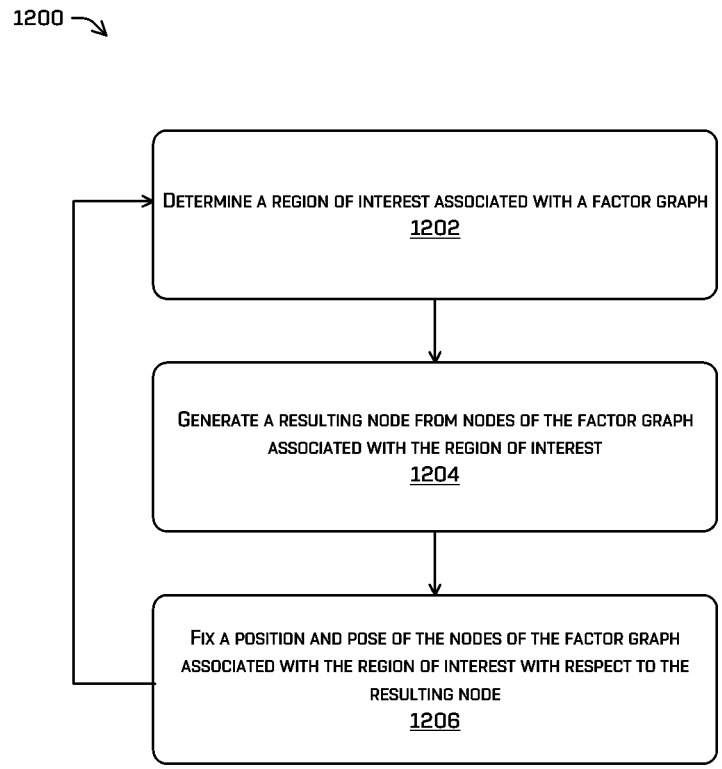
FIG. 12 is a flow diagram illustrating an example process associated with performing pose graph optimization techniques associated with the sparse representation of a physical environment, in accordance with implementations of the disclosure.

FIG. 12 is a flow diagram illustrating an example process 1200 associated with performing pose graph optimization techniques associated with the sparse representation of a physical environment, in accordance with implementations of the disclosure. As discussed above, when collapsing or optimizing one or more regions of the factor graph, the mapping system may cause the nodes within the region to be fixed relative to a resulting node or nodes, such that the data (e.g., pose data and environmental data, and the like), of each node within the region are maintained within the factor graph.

At 1202, the mapping system may determine a region of interest associated with a factor graph. For example, as discussed above, the mapping system may determine the region of interest by identifying that greater than or equal to a threshold number of nodes within a physical distance threshold and/or a graph distance threshold of each other.

At 1204, the mapping system may generate a representative node based at least in part on the nodes of the factor graph associated with the region of interest. For example, during pose optimization, the mapping system may generate a representative node based on the data associated with each node of the region. In other examples, the system may select one of the nodes in the region as the surviving or representative node, as discussed above.

At 1206, the mapping system may store a transform between a of the nodes of the factor graph associated with the region of interest with respect to the representative node. For example, the mapping system may maintain each node at a distance and a 6DOF pose relative to the representative node. In this manner, when the mapping system applies future pose optimization techniques, only the data associated with the representative node need be considered, thereby improving processing time and reducing resource consumption associated with the optimization process.

Figure 13:
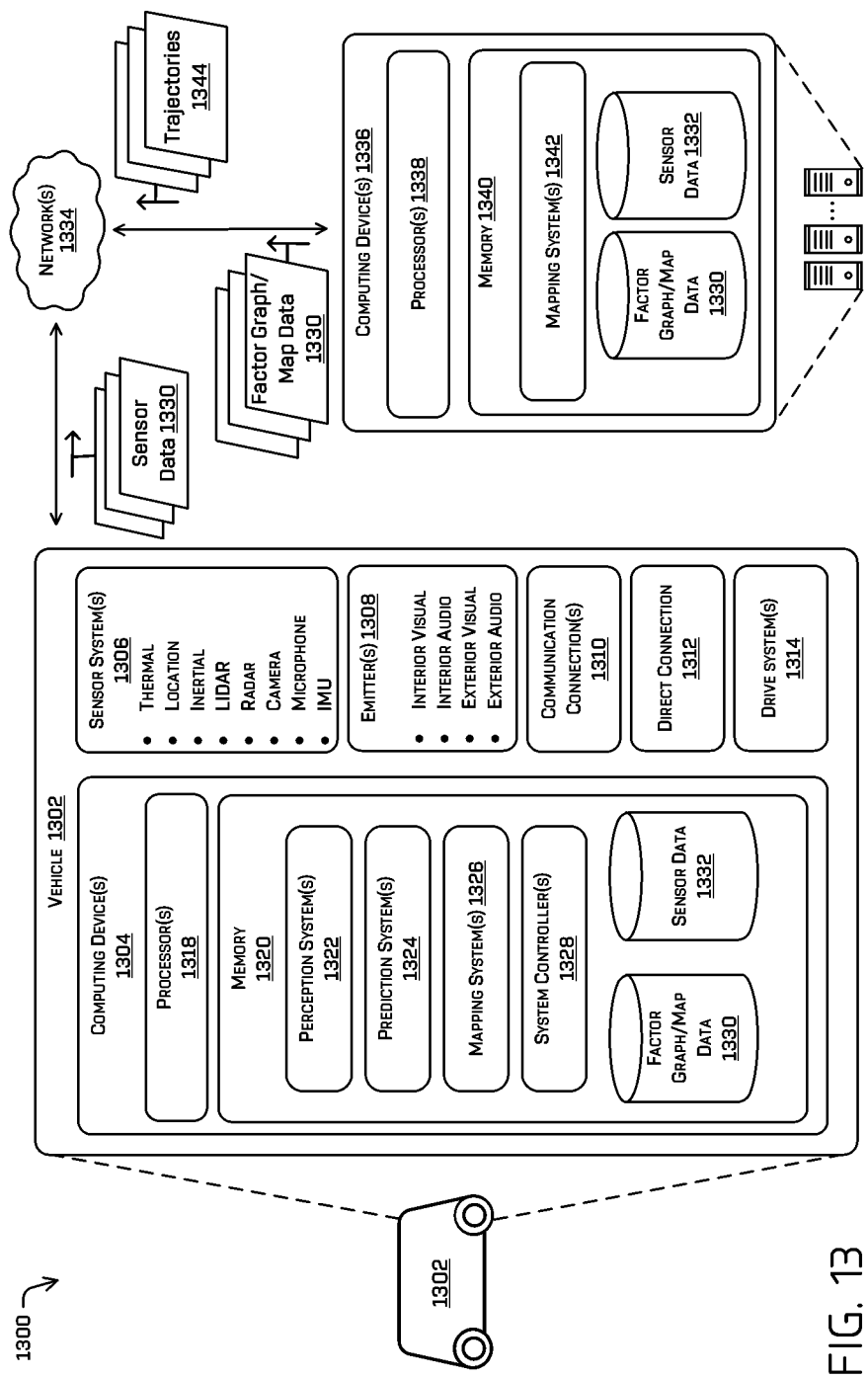
FIG. 13 is a block diagram of an example system for implementing the techniques discussed herein.

FIG. 13 depicts a block diagram of an example system 1300 for implementing the techniques discussed herein. In at least one example, the system 1300 may include a vehicle 1302, such the autonomous vehicles discussed above. The vehicle 1302 may include computing device(s) 1304, one or more sensor system(s) 1306, one or more emitter(s) 1308, one or more communication connection(s) 1310 (also referred to as communication devices and/or modems), at least one direct connection 1313 (e.g., for physically coupling with the vehicle 1302 to exchange data and/or to provide power), and one or more drive system(s) 1314. The one or more sensor system(s) 1306 may be configured to capture the sensor data 1332 associated with a surrounding physical environment.

In at least some examples, the sensor system(s) 1306 may include thermal sensors, time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. In some examples, the sensor system(s) 1306 may include multiple instances of each type of sensors. For instance, time-of-flight sensors may include individual time-of-flight sensors located at the corners, front, back, sides, and/or top of the vehicle 1302. As another example, camera sensors may include multiple cameras disposed at various locations about the exterior and/or interior of the vehicle 1302. In some cases, the sensor system(s) 1306 may provide input to the computing device(s) 1304.

The vehicle 1302 may also include one or more emitter(s) 1308 for emitting light and/or sound. The one or more emitter(s) 1308 in this example include interior audio and visual emitters to communicate with passengers of the vehicle 1302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 708 in this example also include exterior emitters. By way of example and not limitation, the exterior emitters in this example include lights to signal a direction of travel or other indicators of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 1302 can also include one or more communication connection(s) 1310 that enable communication between the vehicle 1302 and one or more other local or remote computing device(s) (e.g., a remote teleoperations computing device) or remote services. For instance, the communication connection(s) 1310 can facilitate communication with other local computing device(s) on the vehicle 1302 and/or the drive system(s) 1314. Also, the communication connection(s) 1310 may allow the vehicle 1302 to communicate with other nearby computing device(s) (e.g., other nearby vehicles, traffic signals, etc.).

The communications connection(s) 1310 may include physical and/or logical interfaces for connecting the computing device(s) 1304 to another computing device or one or more external network(s) 1334 (e.g., the Internet). For example, the communications connection(s) 1310 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 1310 may comprise the one or more modems as described in detail above.

In at least one example, the vehicle 1302 may include one or more drive system(s) 1314. In some examples, the vehicle 1302 may have a single drive system 1314. In at least one example, if the vehicle 1302 has multiple drive systems 1314, individual drive systems 1314 may be positioned on opposite ends of the vehicle 1302 (e.g., the front and the rear, etc.). In at least one example, the drive system(s) 1314 can include one or more sensor system(s) 1306 to detect conditions of the drive system(s) 1314 and/or the surroundings of the vehicle 1302. By way of example and not limitation, the sensor system(s) 1306 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 1314. In some cases, the sensor system(s) 1306 on the drive system(s) 1314 can overlap or supplement corresponding systems of the vehicle 1302 (e.g., sensor system(s) 1306).

The drive system(s) 1314 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 1314 can include a drive system controller which may receive and preprocess data from the sensor system(s) 1306 and to control operation of the various vehicle systems. In some examples, the drive system controller can include one or more processor(s) and memory communicatively coupled with the one or more processor(s). The memory can store one or more modules to perform various functionalities of the drive system(s) 1314. Furthermore, the drive system(s) 1314 also include one or more communication connection(s) that enable communication by the respective drive system with one or more other local or remote computing device(s).

The computing device(s) 1304 may include one or more processors 1318 and one or more memories 1320 communicatively coupled with the processor(s) 1318. In the illustrated example, the memory 1320 of the computing device(s) 1304 stores perception system(s) 1322, prediction system(s) 1324, mapping system(s) 1326, as well as one or more system controller(s) 1328. The memory 1320 may also store data such as sensor data 1332 captured or collected by the one or more sensors systems 1306, factor graph/map data 1330 and sensor data 1332. Though depicted as residing in the memory 1320 for illustrative purposes, it is contemplated that the perception system(s) 1322, prediction system(s) 1324, mapping system(s) 1326, as well as one or more system controller(s) 1328 may additionally, or alternatively, be accessible to the computing device(s) 1304 (e.g., stored in a different component of vehicle 1302 and/or be accessible to the vehicle 1302 (e.g., stored remotely).

The perception system(s) 1322 may be configured to perform object detection, segmentation, and/or classification on the sensor data 1332, such as the image or lidar data. In some examples, the perception system(s) 1322 may generate processed perception data from the sensor data 1332. The perception data may indicate a presence of objects that are in physical proximity to the vehicle 1302 and/or a classification or type of the objects (e.g., car, pedestrian, cyclist, building, tree, road surface, curb, sidewalk, unknown, etc.). In additional and/or alternative examples, the perception system(s) 1322 may generate or identify one or more characteristics associated with the objects and/or the physical environment. In some examples, characteristics associated with the objects may include, but are not limited to, an x-position, a y-position, a z-position, an orientation, a type (e.g., a classification), a velocity, a size, a direction of travel, etc. Characteristics associated with the environment may include, but are not limited to, a presence of another object, a time of day, a weather condition, a geographic position, an indication of darkness/light, etc. For example, details of classification and/or segmentation associated with a perception system are discussed in U.S. application Ser. No. 15/820,245, which are herein incorporated by reference in their entirety.

The prediction system(s) 1324 may be configured to determine a track corresponding to an object identified by the perception system(s) 1322. For example, the prediction system(s) 1324 may be configured to predict a velocity, position, change in trajectory, or otherwise predict the decisions and movement of the identified objects. For example, the prediction system(s) 1324 may include one or more machine learned models that may, based on inputs such as object type or classification and object characteristics, output predicted characteristics of the object at one or more future points in time. For example, details of predictions systems are discussed in U.S. application Ser. Nos. 16/246,208 and 16/420,050, both of which are incorporated herein by reference in their entirety.

The mapping system 1326 may be configured to generate or otherwise utilize the factor graph/map data 1330. For instance, the mapping system 1326 may be configured to generate trajectories for the vehicle 1302 based on the factor graph/map data 1330. The mapping system 1326 may also be configured to update the factor graph/map data 1330 based on the captured sensor data 1332 as discussed above with respect to FIGS. 1-12.

In at least one example, the computing device(s) 1304 may store one or more and/or system controllers 1328, which may be configured to control steering, propulsion, braking, safety, emitters, communication, and other systems of the vehicle 1302. The system controllers 1328 may communicate with and/or control corresponding systems of the drive system(s) 1314 and/or other components of the vehicle 1302, which may be configured to operate in accordance with a route provided from a planning system.

In some implementations, the vehicle 1302 may connect to computing device(s) 1336 via the network(s) 1334. For example, the computing device(s) 1336 may generate and provide the factor graph/map data 1330 and/or trajectories 1344 to and receive the sensor data 1332 from the vehicle 1302. The computing device 1336 may include one or more processor(s) 1338 and memory 1340 communicatively coupled with the one or more processor(s) 1338. In at least one instance, the processor(s) 1338 may be similar to the processor(s) 1318 and the memory 1340 may be similar to the memory 1320. In the illustrated example, the memory 1340 of the computing device(s) 1336 stores the graph/map data 1330 and the sensor data 1332. The memory 1340 may also store a map generation system 1342 to assist with compiling and generating the factor graph/map data 1330, as discussed above with respect to FIGS. 1-12.

The processor(s) 1318 of the computing device(s) 1304 and the processor(s) 1338 of the computing device(s) 1336 may be any suitable processor capable of executing instructions to process data and perform operations as described herein. By way of example and not limitation, the processor(s) 1318 and 1338 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 1320 of the computing device(s) 1304 and the memory 1340 of the computing device(s) 1336 are examples of non-transitory computer-readable media. The memory 1320 and 1340 can store an operating system and one or more software applications, instructions, programs, and/or data to implement the methods described herein and the functions attributed to the various systems. In various implementations, the memory 1320 and 1340 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein. In some instances, aspects of some or all of the components discussed herein can include any models, algorithms, and/or machine learning algorithms. For example, in some instances, the components in the memory 1320 and 1340 can be implemented as a neural network.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples. For example, the components and instructions of FIG. 13 may utilize the processes and flows of FIGS. 1-13.

A non-limiting list of objects may include obstacles in an environment, including but not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

EXAMPLE CLAUSES

A. An system comprising: one or more processors; and one or more non-transitory computer-readable media storing instructions that, when executed by the one or more processors, cause the one or more processors to perform operations comprising: receiving data associated with a fleet of autonomous vehicles; determining, based at least in part on the data, a factor graph representative of an environment through which the fleet of autonomous vehicles traveled; determining that a first node of the factor graph is less than or equal to a threshold distance from a second node of the factor graph, the first node of the factor graph representing a first portion of the data associated with a first vehicle of the fleet having a first pose data and the second node of the factor graph representing a second portion of the data associated with a second vehicle of the fleet having a second pose; determining a third node of the factor graph based at least in part on the first data, the first pose, the second data, and the second pose, the third node having third data; discarding one or more of the first node or the second node; generating an updated representation of the factor graph including the third node; and transmitting the updated representation to an autonomous vehicle, the autonomous vehicle configured to determine one or more of a position or an orientation relative to the environment represented by the factor graph.

B. The system of claim A, wherein the third node is the first node and the third data is the first data.

C. The system of claim A, wherein discarding one or more of the first node or the second node comprises: determining a confidence level associated with a localization operation based on the third data; and determining the confidence level meets or exceeds a threshold confidence level.

D. The system of claim A, wherein determining the distance between the first node and the second node is less than or equal to a threshold distance comprises one or more of: determining a physical distance between a first location associated with the first node and a second location associated with the second node, or determining an amount of overlap between the first portion of data and the second portion of data.

E. The system of claim A, wherein the operations further comprise: receiving additional data associated with an additional region; determining a confidence value associated with a localization operation based on the factor graph at the additional region is less than or equal to a threshold confidence level; including the additional data as an additional node of the factor graph; and performing a pose graph optimization over the factor graph.

F. A method comprising: determining a region of interest associated with a factor graph, the region of interest comprising at least a first node and a second node and the factor graph representative of an environment through which a vehicle travels; determining the first node as a representative node of the region of interest; determining a transform between a first pose of the first node and a second pose of the second node; maintaining the second node relative to the first node based at least in part on the transform; generating a first link between the first node and a third node, the third node external to the region of interest; generating an updated representation of an environment based at least in part on the first node and the third node; and sending the updated representation to an autonomous vehicle.

G. The method of paragraph F, wherein generating the first link between the first node and the third node is based at least in part on a Euclidian distance between the first node and the third node.

H. The method of paragraph G, further comprising generating a second link between the first node and a fourth node external to the region of interest based at least in part on one or more of the following: a covisibility of a region of an environment within sensor data associated with the first node and sensor data associated with the third node; a graph distance between the first node and the third node; a shared unary global factor associated with a position of the first node and a position of the third node; or a detected loop closure between the sensor data associated with the first node and the sensor data associated with the third node.

I. The method of paragraph F, wherein determining the first node as the representative node is based at least in part on one or more of the following: a relative position between the first node and the second node; a relative position between the first node, the second node, and at least a third node, the third node; a quality of sensor data associated with the first node and the second node; a quality of the factor graph within the region of interest; a convergence metric associated with the region of interest; or a covisibility metric associated with the sensor data of the first node and the second node.

J. The method of paragraph F, wherein the transform is a first transform, the region of interest is a first region of interest, and the method further comprising: determining a second region of interest associated with the factor graph, the second region of interest comprising at least the first node and a fourth node; determining the fourth node as a representative node of the second region of interest; determining a second transform between a third pose of the fourth node and a fourth pose of the first node; maintaining the first node relative to the fourth node based at least in part on the second transform; maintaining the second node relative to the first node based at least in part on the first transform; and generating a second link between the fourth node and the third node, the third node external to the first region of interest and the second region of interest.

K. The method of paragraph F, further comprising receiving data associated with a second region of interest; determining a confidence value associated with a localization operation based on the factor graph at the second region of interest is less than or equal to a threshold confidence level; including the data as an additional node of the factor graph; and performing a pose graph optimization over the factor graph.

L. The method of paragraph F, wherein the region of interest is determined based at least in part on one or more of the following: a Euclidian distance threshold between the first node and a fourth node, the fourth node external to the region of interest; and a quality of sensor data associated with the first node and the second node.

M. The method of paragraph F, wherein determining the region of interest is responsive to one or more of the following: determining an age of the first node or the second node exceeds or meets a first threshold; determining a number of nodes within the region of interest meets or exceeds a second threshold; a convergence metric associated with the region of interest meets or exceeds a third threshold; or a point cloud nosiness associated with the region of interest meets or exceeds a fourth threshold.

N. A non-transitory computer-readable medium storing instructions that, when executed, cause one or more processors to perform operations comprising: determining a region of interest associated with a factor graph, the region of interest comprising at least a first node and a second node and the factor graph representative of an environment through which a vehicle travels; determining the first node as a representative node of the region of interest; determining a transform between a first pose of the first node and a second pose of the second node; maintaining the second node relative to the first node based at least in part on the transform; generating a first link between the first node and a third node, the third node external to the region of interest; and generating an updated representation of an environment based at least in part on the first node and the third node.

O. The non-transitory computer-readable medium of paragraph N, wherein determining the first node as the representative node is based at least in part on one or more of the following: a relative position between the first node and the second node; a relative position between the first node, the second node, and at least a third node, the third node; a quality of sensor data associated with the first node and the second node; or a quality of the factor graph within the region of interest.

P. The non-transitory computer-readable medium of paragraph N, wherein the region of interest is determined based at least in part on one or more of the following: a Euclidian distance threshold between the first node and a fourth node, the fourth node external to the region of interest; or a quality of sensor data associated with the first node and the second node.

Q. The non-transitory computer-readable medium of paragraph N, wherein generating the first link between the first node and the third node is based at least in part on one or more of the following: a Euclidian distance between the first node and the third node; a covisibility of a region of the environment within sensor data associated with the first node and sensor data associated with the third node; a graph distance between the first node and the third node; a shared unary global factor associated with a position of the first node and a position of the third node; or a detected loop closure between the sensor data associated with the first node and the sensor data associated with the third node.

R. The non-transitory computer-readable medium of paragraph N, wherein the operations further comprise: determining a second region of interest associated with the factor graph, the second region of interest comprising at least the first node and a fourth node; determining the fourth node as a representative node of the second region of interest; determining a second transform between a third pose of the fourth node and a fourth pose of the first node; maintaining the first node relative to the fourth node based at least in part on the second transform; maintaining the second node relative to the first node based at least in part on the first transform; and generating a second link between the fourth node and the third node, the third node external to the first region of interest and the second region of interest.

S. The non-transitory computer-readable medium of paragraph N, wherein the operations further comprise: receiving data associated with a second region of interest; determining a confidence value associated with a localization operation based on the factor graph at the second region of interest is less than or equal to a threshold confidence level; including the data as an additional node of the factor graph; and performing a pose graph optimization over the factor graph.

T. The non-transitory computer-readable medium of paragraph N, further comprising sending the updated representation to an autonomous vehicle.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

What is claimed is:
1. A system comprising:
one or more processors; and
one or more non-transitory computer-readable media storing instructions that, when executed by the one or more processors, cause the one or more processors to perform operations comprising:
receiving data associated with a fleet of autonomous vehicles;
determining, based at least in part on the data, a factor graph representative of an environment through which the fleet of autonomous vehicles traveled;
determining that a first node of the factor graph is less than or equal to a threshold distance from a second node of the factor graph, the first node of the factor graph representing a first portion of the data associated with a first vehicle of the fleet having a first pose data and the second node of the factor graph representing a second portion of the data associated with a second vehicle of the fleet having second pose data, and wherein the first pose data is different than the second pose data; and
based at least in part on determining that the first node is less than or equal to the threshold distance from the second node:
determining a third node of the factor graph based at least in part on the first data, the first pose, the second data, and the second pose, the third node having third data;
discarding one or more of the first node or the second node;
generating an updated representation of the factor graph including the third node; and
transmitting the updated representation to an autonomous vehicle, the autonomous vehicle configured to determine one or more of a position or an orientation relative to the environment represented by the factor graph.

2. The system as recited in claim 1, wherein the third node is the first node and the third data are the first data.

3. The system as recited in claim 1, wherein discarding one or more of the first node or the second node comprises:
determining a confidence level associated with a localization operation based on the third data; and
determining the confidence level meets or exceeds a threshold confidence level.

4. The system as recited in claim 1, wherein determining that the distance between the first node and the second node is less than or equal to the threshold distance comprises one or more of:
determining a physical distance between a first location associated with the first node and a second location associated with the second node, or
determining an amount of overlap between the first portion of data and the second portion of data.

5. The system as recited in claim 1, wherein the operations further comprise:
receiving additional data associated with an additional region;
determining that a confidence value associated with a localization operation based on the factor graph at the additional region is less than or equal to a threshold confidence level;
including the additional data as an additional node of the factor graph; and
performing a pose graph optimization over the factor graph.

6. A method comprising:
determining a region of interest associated with a factor graph, the region of interest comprising at least a first node of the factor graph and a second node of the factor graph and the factor graph representative of an environment through which a vehicle travels;
determining the first node as a representative node of the region of interest;
determining a transform between a first pose of the first node and a second pose of the second node;
maintaining the second node relative to the first node based at least in part on the transform by maintaining data about a relation between the first pose of the first node and the second pose of the second node;
generating a first link between the first node and a third node of the factor graph, the third node external to the region of interest;
generating an updated representation of an environment based at least in part on the first node and the third node; and
sending the updated representation to an autonomous vehicle.

7. The method as recited in claim 6, wherein generating the first link between the first node and the third node is based at least in part on a Euclidian distance between the first node and the third node.

8. The method as recited in claim 7, further comprising generating a second link between the first node and a fourth node of the factor graph that is external to the region of interest based at least in part on one or more of the following:
a covisibility of a region of an environment within sensor data associated with the first node and sensor data associated with the third node;
a graph distance between the first node and the third node;
a shared unary global factor associated with a position of the first node and a position of the third node; or
a detected loop closure between the sensor data associated with the first node and the sensor data associated with the third node.

9. The method as recited in claim 6, wherein determining the first node as the representative node is based at least in part on one or more of the following:
a relative position between the first node and the second node;
a relative position between the first node, the second node, and at least the third node;
a quality of sensor data associated with the first node and the second node;
a quality of the factor graph within the region of interest;
a convergence metric associated with the region of interest; or
a covisibility metric associated with the sensor data of the first node and the second node.

10. The method as recited in claim 6, further comprising:
receiving data associated with a second region of interest;
determining a confidence value associated with a localization operation based on the factor graph at the second region of interest is less than or equal to a threshold confidence level;
including the data as an additional node of the factor graph; and
performing a pose graph optimization over the factor graph.

11. The method as recited in claim 6, wherein the region of interest is determined based at least in part on one or more of the following:
a Euclidian distance threshold between the first node and a fourth node of the factor graph, the fourth node external to the region of interest; and a quality of sensor data associated with the first node and the second node.

12. The method as recited in claim 6, wherein determining the region of interest is responsive to one or more of the following:
   determining an age of the first node or the second node exceeds or meets a first threshold;
   determining a number of nodes within the region of interest meets or exceeds a second threshold;
   a convergence metric associated with the region of interest meets or exceeds a third threshold; or
   a point cloud nosiness associated with the region of interest meets or exceeds a fourth threshold.

13. One or more non-transitory computer-readable media storing instructions that, when executed, cause one or more processors to perform operations comprising:
   determining a region of interest associated with a factor graph, the region of interest comprising at least a first node of the factor graph and a second node of the factor graph and the factor graph representative of an environment through which a vehicle travels;
   determining the first node as a representative node of the region of interest;
   determining a transform between a first pose of the first node and a second pose of the second node;
   maintaining the second node relative to the first node based at least in part on the transform by maintaining data about a relation between the first pose of the first node and the second pose of the second node;
   generating a first link between the first node and a third node of the factor graph, the third node external to the region of interest;
   generating an updated representation of an environment based at least in part on the first node and the third node; and
   at least one of sending the updated representation to an autonomous vehicle or controlling the autonomous vehicle based on the updated representation.

14. The one or more non-transitory computer-readable media as recited in claim 13, wherein determining the first node as the representative node is based at least in part on one or more of the following:
   a relative position between the first node and the second node;
   a relative position between the first node, the second node, and at least the third node;
   a quality of sensor data associated with the first node and the second node; or
   a quality of the factor graph within the region of interest.

15. The one or more non-transitory computer-readable media as recited in claim 13, wherein the region of interest is determined based at least in part on one or more of the following:
   a Euclidian distance threshold between the first node and a fourth node of the factor graph, the fourth node external to the region of interest; or
   a quality of sensor data associated with the first node and the second node.

16. The one or more non-transitory computer-readable media as recited in claim 13, wherein generating the first link between the first node and the third node is based at least in part on one or more of the following:
   a Euclidian distance between the first node and the third node;
   a covisibility of a region of the environment within sensor data associated with the first node and sensor data associated with the third node;
   a graph distance between the first node and the third node;
   a shared unary global factor associated with a position of the first node and a position of the third node; or
   a detected loop closure between the sensor data associated with the first node and the sensor data associated with the third node.

17. The one or more non-transitory computer-readable media as recited in claim 13, wherein the operations further comprise:
   receiving data associated with a second region of interest;
   determining a confidence value associated with a localization operation based on the factor graph at the second region of interest is less than or equal to a threshold confidence level;
   including the data as an additional node of the factor graph; and
   performing a pose graph optimization over the factor graph.

18. The one or more non-transitory computer-readable media as recited in claim 13, wherein the operations comprise sending the updated representation to the autonomous vehicle.

19. The system of claim 1, wherein:
   the first portion is captured from the first vehicle and relates to a first time interval in which the first vehicle is estimated to have the first pose data, and
   the second portion is captured from the second vehicle and relates to a second time interval in which the second vehicle is estimated have the second pose data.

20. The system of claim 1, wherein discarding one or more of the first node or the second node comprises removing one or more of the first node or the second node from the factor graph based at least in part on determining that a number of nodes in a region comprising the first node and the second node is greater than a threshold number.

* * * * *